United States Patent
Park et al.

(10) Patent No.: US 10,056,604 B2
(45) Date of Patent: Aug. 21, 2018

(54) CATHODE MATERIAL COMPOSITE HAVING IMPROVED CONDUCTIVITY, CATHODE AND ELECTROCHEMICAL DEVICE HAVING THE SAME

(71) Applicant: LG Chem, Ltd., Seoul (KR)

(72) Inventors: Ji-Hye Park, Daejeon (KR); Song-Taek Oh, Daejeon (KR); Hyeok-Moo Lee, Daejeon (KR)

(73) Assignee: LG Chem, Ltd. (KR)

( * ) Notice: Subject to any disclaimer, the term of this patent is extended or adjusted under 35 U.S.C. 154(b) by 483 days.

(21) Appl. No.: 14/574,942

(22) Filed: Dec. 18, 2014

(65) Prior Publication Data
US 2015/0104707 A1    Apr. 16, 2015

Related U.S. Application Data

(63) Continuation of application No. PCT/KR2014/005166, filed on Jun. 12, 2014.

(30) Foreign Application Priority Data

Jul. 4, 2013 (KR) .......................... 10-2013-0078383

(51) Int. Cl.
*H01M 4/13* (2010.01)
*H01M 4/1315* (2010.01)
(Continued)

(52) U.S. Cl.
CPC ......... *H01M 4/1315* (2013.01); *H01M 4/131* (2013.01); *H01M 4/505* (2013.01);
(Continued)

(58) Field of Classification Search
CPC .... H01M 4/131; H01M 4/1315; H01M 4/366; H01M 4/624; H01M 4/625; H01M 4/623
See application file for complete search history.

(56) References Cited

U.S. PATENT DOCUMENTS

| | | | |
|---|---|---|---|
| 2002/0034583 A1* | 3/2002 | Jung | H01M 4/131 427/126.3 |
| 2005/0008934 A1* | 1/2005 | Oyama | H01G 9/22 429/213 |

(Continued)

FOREIGN PATENT DOCUMENTS

| | | |
|---|---|---|
| CN | 103190020 A | 7/2013 |
| JP | H11329415 A | 11/1999 |

(Continued)

OTHER PUBLICATIONS

"LiMn2O4 as a Li-Ion Battery Cathode", Tom Eriksson, Comprehensive Summaries of Uppsala Dissertations from the Faculty of Science and Technology 651, preface plus 53 pages, 2001.*

(Continued)

*Primary Examiner* — Kenneth J Douyette
(74) *Attorney, Agent, or Firm* — Lerner, David, Littenberg, Krumholz & Mentlik, LLP

(57) ABSTRACT

The present disclosure refers to a cathode material composite having improved conductivity, and a cathode and electrochemical device having the cathode material composite. In accordance with one embodiment of the present disclosure, a conductive polymer is positioned on the surface of a shell present in the form of a tetragonal structure in the lithium manganese oxide, thereby enhancing electrical conductivity to be highly involved in reaction around 3V, and providing a conductive path to improve the capacity, life and rate characteristics of an electrochemical device.

8 Claims, 1 Drawing Sheet

(51) Int. Cl.
*H01M 4/36* (2006.01)
*H01M 4/62* (2006.01)
*H01M 4/131* (2010.01)
*H01M 4/505* (2010.01)
*H01M 10/052* (2010.01)
*H01M 4/525* (2010.01)
*H01M 2/16* (2006.01)
*H01M 4/58* (2010.01)

(52) U.S. Cl.
CPC ......... *H01M 4/525* (2013.01); *H01M 4/624* (2013.01); *H01M 10/052* (2013.01); *H01M 2/1646* (2013.01); *H01M 2/1686* (2013.01); *H01M 4/366* (2013.01); *H01M 4/582* (2013.01); *H01M 4/5825* (2013.01); *H01M 4/622* (2013.01); *H01M 4/623* (2013.01); *H01M 4/625* (2013.01); *Y02T 10/7011* (2013.01)

(56) References Cited

U.S. PATENT DOCUMENTS

2011/0311869 A1 12/2011 Oh et al.
2013/0022872 A1 1/2013 Noh et al.
2013/0183588 A1* 7/2013 Oh .................. H01M 4/505
                                                    429/231.95
2013/0252095 A1 9/2013 Kamine et al.

FOREIGN PATENT DOCUMENTS

| | | |
|---|---|---|
| JP | 2002008638 A | 1/2002 |
| JP | 2002358959 A | 12/2002 |
| JP | 2007052940 A | 3/2007 |
| JP | 2011100594 A | 5/2011 |
| KR | 20060084886 A | 7/2006 |
| KR | 10-0938138 B1 | 1/2010 |
| KR | 20110081107 A | 7/2011 |
| KR | 2012-0033383 A | 4/2012 |
| KR | 2012-0089111 A | 8/2012 |
| KR | 10-1190185 B1 | 10/2012 |
| WO | 2010-027119 A1 | 3/2010 |
| WO | WO 2012039564 A2 * | 3/2012 ............ H01M 4/505 |

OTHER PUBLICATIONS

International Search Report from Application No. PCT/KR2014/005166, dated Oct. 16, 2014.

* cited by examiner

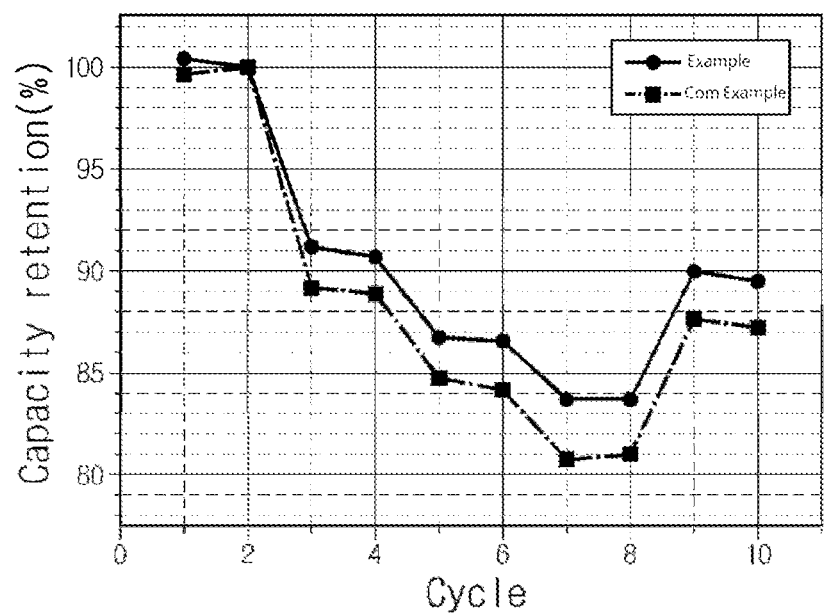

CATHODE MATERIAL COMPOSITE HAVING IMPROVED CONDUCTIVITY, CATHODE AND ELECTROCHEMICAL DEVICE HAVING THE SAME

CROSS-REFERENCE TO RELATED APPLICATION

This application is a continuation of International Application No. PCT/KR2014/005166 filed on Jun. 12, 2014, which claims priority under 35 USC 119(a) to Korean Patent Application No. 10-2013-0078383 filed in the Republic of Korea on Jul. 4, 2013, which is incorporated herein by reference.

TECHNICAL FIELD

The present disclosure relates to a cathode material composite having improved conductivity, more specifically a cathode material composite which is enhanced in electrical conductivity to be highly involved in reaction around 3V, and provides a conductive path to improve the capacity, life and rate characteristics of an electrochemical device, and a cathode and electrochemical device having the cathode material composite.

BACKGROUND ART

Recently, there has been an increasing interest in energy storage technology. As the application fields of energy storage technologies have been extended to mobile devices such as cellular phones, camcorders and notebook computers, the demand for electrochemical devices as a power source has been increasing. Among electrochemical devices, lithium secondary batteries have been commercially available and well used by virtue of its high energy density and voltage, long cycle life, and low self-discharge rate.

Also, recently, with the growing interest in environmental issues, many studies are conducted on electric vehicles (EVs) and hybrid electric vehicles (HEVs) other than vehicles running on fossil fuels, such as gasoline vehicles and diesel vehicles being attributable to air pollution. These electric vehicles and hybrid electric vehicles largely use Ni-metal hydride secondary batteries, and also lithium secondary batteries having high energy density and voltage, long cycle life and low self-discharge rate are actively researched for their use and have reached commercialization.

In such a lithium secondary battery, carbon materials have been largely used as a cathode active material, and also the use of metallic lithium or sulfur-containing compounds has been considered. In addition, lithium-containing cobalt oxides ($LiCoO_2$), as well as $LiMnO_2$ of a layered crystal structure, lithium-containing manganese oxides such as $LiMn_2O_4$ of a spinel crystal structure, and lithium-containing nickel oxides ($LiNiO_2$) have been used as a cathode active material.

Among these, $LiCoO_2$ having excellent life characteristics and good charging/discharging efficiency has been used the most, but has disadvantages in terms of low structural safety, and high price due to resource limits of cobalt as a raw material which results in low price competitiveness. Accordingly, $LiCoO_2$ is insufficient to use in large amounts as a power source in the field of industries such as electric vehicles.

Meanwhile, $LiNiO_2$ as a cathode active material is relatively inexpensive and has high discharge capacity, but undergoes rapid phase transition in its crystal structure due to volume change generated during charge/discharge cycles. Also, when $LiNiO_2$ is exposed to air or moisture, its safety is rapidly lowered.

Lithium manganese oxides such as $LiMnO_2$ and $LiMn_2O_4$ have advantages of good thermal stability and inexpensiveness, but are unfavorable in terms of low capacity, and poor cycle and high-temperature characteristics.

Among the lithium manganese oxides, spinel $LiMn_2O_4$ exhibits relatively even potential around 4V (between 3.7 and 4.3 V) and around 3V (between 2.5 and 3.5 V) and has a theoretical capacity of about 120 mAh/g at such areas. However, spinel $LiMn_2O_4$ exhibits poor cycle and storage characteristics around 3V, making it difficult to be applied. This is because of phase transition induced by Jahn-Teller distortion, that is, $LiMn_2O_4$ exists in a single phase of a cubic phase around 4V and it exists in two phases of the cubic phase and a tetragonal phase around 3V. Another reason is the release of manganese into an electrolytic solution. Above all, the contraction and expansion of volume may cause a short circuit between a conductive material or a polymer binder and a current collector.

For these reasons, the lithium manganese oxides having a spinel structure exhibit an actual capacity lower than the theoretical capacity and low C-rate characteristics around 3V.

Accordingly, it is known that the lithium manganese oxides having a spinel structure are difficult to be used around 3V, and in order to solve this problem, there are some attempts of forming a tetragonal phase and S-doping to improve cycle characteristics around 3V. However, such an attempt has provided insignificant effect or has not surely proven the reason of improvement.

Therefore, there is still a need for developing a spinel-structured lithium manganese oxide having good capacity and superior life characteristics around 3V.

DISCLOSURE

Technical Problem

The present disclosure is designed to solve the above-mentioned problems, and therefore it is an object of the present disclosure to provide a cathode material composite comprising a spinel-structured lithium manganese oxide, which can provide good capacity and superior life characteristics by confirming the core-shell phase transition of the lithium manganese oxide whose crystal structure is changed from the surface of particles to the center thereof during discharging up to between 2.5 and 3.5 V, and further adding a conductive polymer on the surface of the shell to improve the electrical conductivity in the tetragonal structure of the shell; and a cathode and an electrochemical device comprising the cathode material composite.

Technical Solution

In order to achieve the above object, in accordance with one aspect of the present disclosure, there is provided a cathode material composite comprising a spinel-structured lithium manganese oxide whose crystal structure is a core-shell structure induced by phase transition of a cubic structure into a tetragonal structure from the surface of particles to the center thereof during discharging up to between 2.5 and 3.5 V, wherein the cathode material composite further comprises a conductive material, a polymer binder, a conductive polymer on the surface of the shell having the tetragonal structure formed by the phase transition in the discharging process.

In the present disclosure, the lithium manganese oxide is represented by the following formula (I):

$$Li_{1+x}M_yMn_{2-x-y}O_{4-z}Q_z$$

wherein, x, y, and z satisfy $0 \leq x \leq 0.3$, $0 \leq y \leq 1$, and $0 \leq z \leq 1$;

M is any one selected from the group consisting of Al, Mg, Ni, Co, Fe, Cr, V, Ti, Cu, B, Ca, Zn, Zr, Nb, Mo, Sr, Sb, W, Ti, Bi, and a mixture thereof; and Q is any one selected from the group consisting of N, F, S, Cl, and a mixture thereof.

The conductive polymer may be any one selected from polyaniline, polypyrrole, polythiophene, polysulfurnitride, and a mixture thereof.

The polythiophene may be poly(3,4-ethylenedioxy)thiophene.

Also, the conductive material may be any one selected from the group consisting of graphite, carbon fiber, carbon black, acetylene black, ketjen black, carbon nanotube, and a mixture thereof.

The polymer binder may be any one selected from the group consisting of polyvinylidene fluoride (PVDF), hexafluoro propylene (HFP), polyvinylidene fluoride-co-hexafluoro propylene, polyvinylidene fluoride-co-trichloroethylene, polymethyl methacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile-styrene-butadiene copolymer, polyimide, and a mixture thereof.

The cathode material composite may comprise 85 to 95 wt % of the lithium manganese oxide, 1 to 7 wt % of the conductive material, 1 to 7 wt % of polymer binder, and 0.5 to 1.5 wt % of the conductive binder.

Further, in accordance with another aspect of the present disclosure, there is provided a cathode comprising a current collector and a cathode active material layer formed on the current collector, wherein the cathode active material layer has the above-mentioned cathode material composite.

Furthermore, in accordance with still another aspect of the present disclosure, there is provided an electrochemical device comprising a cathode, an anode, a separator interposed between the cathode and the anode, and an electrolyte solution, wherein the cathode is one defined in the present disclosure.

The electrochemical device may be a lithium secondary battery.

Advantageous Effects

The cathode material composite according to one embodiment of the present disclosure has a spinel-structured lithium manganese oxide and further comprises a conductive polymer on the surface of a shell present in the form of a tetragonal structure in the lithium manganese oxide, thereby enhancing electrical conductivity to be highly involved in reaction around 3V, and providing a conductive path to improve the capacity, life and rate characteristics of an electrochemical device.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

FIG. 1 is a graph showing rate characteristics of half-cells prepared in the Example and the Comparative Example of the present disclosure.

BEST MODE

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The cathode material composite according to the present disclosure comprises a spinel-structured lithium manganese oxide whose crystal structure is a core-shell structure induced by phase transition of a cubic structure into a tetragonal structure from the surface of particles to the center thereof during discharging up to between 2.5 and 3.5 V, and the cathode material composite further comprises a conductive material, a polymer binder, a conductive polymer on the surface of the shell having the tetragonal structure formed by the phase transition in the discharging process.

General lithium manganese oxides having a spinel structure exist in a single phase of a cubic structure around 4V (between 3.7 and 4.3 V), and are subject to phase transition into a tetragonal structure around 3V (between 2.5 and 3.5 V) by Jahn-Teller distortion due to the presence of excessive $Mn^{3+}$ around 3V. That is, a core-shell phase transition phenomenon occurs to substantially lower charging/discharging characteristics. For example, when preparing electrochemical devices under the same conditions, an actual capacity around 4V is close to a theoretical capacity (being about 120 mAh/g in both areas of around 3V and around 4V, while an actual capacity around 3V is about 90 mAh/g which is very below the theoretical capacity.

By such core-shell phase transition, a cubic structure of core-forming lithium manganese oxide is surrounded by a tetragonal structure of shell-forming lithium manganese oxide having a low electrical conductivity, thereby being not to be involved in reaction, or being involved in reaction in only the low rate discharging but not in the high rate discharging. This deteriorates rate characteristics and lowers capacity.

In contrast, the present disclosure uses a spinel-structured lithium manganese oxide and further comprises a conductive polymer on the surface of the shell of the lithium manganese oxide to enhance the electrical conductivity of the tetragonal structure present in the shell, thereby raising an involvement in reaction around 3V and providing a conductive path to improve the capacity, life and rate characteristics of an electrochemical device.

In the present disclosure, the lithium manganese oxide is represented by the following formula (I):

$$Li_{1+x}M_yMn_{2-x-y}O_{4-z}Q_z$$

wherein, x, y, and z satisfy $0 \leq x \leq 0.3$, $0 \leq y \leq 1$, and $0 \leq z \leq 1$; M is any one selected from the group consisting of Al, Mg, Ni, Co, Fe, Cr, V, Ti, Cu, B, Ca, Zn, Zr, Nb, Mo, Sr, Sb, W, Ti, Bi, and a mixture thereof; and Q is any one selected from the group consisting of N, F, S, Cl, and a mixture thereof. For reference, z and y may vary depending on the oxidation state of M and Q, which can be easily in formula (I).

Generally, lithium manganese oxides may be in the form of secondary particles obtained by agglomeration of a plurality of primary particles. The core-shell structure of phase transition may occur in primary particles themselves. Alternatively, in secondary particles being agglomerates of primary particles, the primary particles of an outside surface (a shell) may be subject to phase transition into a tetragonal structure, and the primary particles of a core may maintain their cubic structure.

In the present disclosure, the conductive polymer may be any one selected from polyaniline, polypyrrole, polythiophene, polysulfurnitride, and a mixture thereof. The polythiophene may be poly(3,4-ethylenedioxy)thiophene.

Also, the conductive material is not particularly limited if it is an electrically conductive material which does not cause chemical change in an electrochemical device. As the conductive material, carbon black, graphite, carbon fiber, carbon nanotube, metal powders, and conductive metal oxides may be generally used, and examples of a commercially available conductive material include acetylene black series (Chevron Chemical Company or Gulf Oil Company), Ketjen Black EC series (Armak Company), Vulcan, XC-72 (Cabot Company) and Super P (MMM Carbon Company).

The polymer binder may be any one selected from the group consisting of polyvinylidene fluoride (PVDF), hexafluoro propylene (HFP), polyvinylidene fluoride-co-hexafluoro propylene, polyvinylidene fluoride-co-trichloroethylene, polymethyl methacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile-styrene-butadiene copolymer, polyimide, and a mixture thereof.

Meanwhile, the cathode material composite may comprise 85 to 95 wt % of the lithium manganese oxide, 1 to 7 wt % of the conductive material, 1 to 7 wt % of polymer binder, and 0.5 to 1.5 wt % of the conductive binder.

When such numerical ranges are satisfied, the amount of the lithium manganese oxide in a cathode active material layer is sufficient to prevent the capacity of an electrochemical device being lowered, and enhances electrical conductivity in the shell of the lithium manganese oxide being subject to phase transition into a tetragonal structure, thereby improving the capacity, life and rate characteristics of the electrochemical device.

Particularly, if the amount of the conductive binder exceeds 1.5 wt %, the cathode material composite may be gelatinized to cause a problem in the coating of the cathode material composite.

Meanwhile, the cathode according to the present disclosure comprises a current collector and a cathode active material layer formed on the current collector, wherein the cathode active material layer has the above-mentioned cathode material composite.

The current collector used in the cathode may be made of any high conductive metal as long as a slurry of the active material can easily adhere and has no reactivity within the voltage range of a battery. Specifically, non-limiting examples of the cathode current collector include aluminum foils, nickel foils and a combination thereof. Also, the current collector may be used in a laminated form of substrates made of such materials.

The cathode may be prepared by mixing the cathode material composite defined in the present disclosure and a solvent having a high boiling point to form a slurry containing the composite, and applying the slurry on a current collector, followed by drying, compression molding, and then heat-treatment at a temperature of 50 to 250° C. under vacuum for 2 hours.

Also, the cathode has a layer thickness (per one side of a current collector) of 30 to 120 µm, preferably 50 to 100 µm. When the cathode satisfies such a thickness range, a sufficient amount of an active material is provided in a cathode active material layer to prevent a battery capacity from being lowered and improve cycle and rate characteristics.

Further, the electrochemical device according to the present disclosure comprises a cathode, an anode, a separator interposed between the cathode and the anode, and an electrolyte solution, wherein the cathode is one defined in the present disclosure.

The electrochemical devices may be any device in which electrochemical reactions may occur, and specific examples of the electrochemical devices include all kinds of secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

Also, in the electrochemical device according to the present disclosure, stack (lamination), folding, and stack/folding of a separator and electrodes, as well as a conventional winding process may be applied.

In addition, the electrochemical device of the present disclosure is not limited to its shape. For example, the shape of the electrochemical device may be cylindrical such as a can, prismatic, pouch, or coin.

In the present disclosure, the anode comprises a current collector and an anode active material layer formed on the current collector, and the current collector used in the anode may be made of any high conductive metal as long as a slurry of the active material can easily adhere and has no reactivity within the voltage range of a battery. Specifically, non-limiting examples of the anode current collector include copper foils, gold foils, nickel foils, copper alloy foils and a combination thereof. Also, the current collector may be used in a laminated form of substrates made of such materials.

The anode active material may be a carbon-based material, lithium metal, a metal compound or a mixture thereof which can conventionally intercalate and disintercalate lithium ions.

Specifically, the carbon-based material may be low-crystalline carbon or high-crystalline carbon. Representative examples of the low-crystalline carbon include soft carbon and hard carbon, and representative examples of the high-crystalline carbon include natural graphite, Kish graphite, pyrolytic carbon, mesophase pitch based carbon fiber, mesocarbon microbeads, mesophase pitches, and high-temperature sintered carbon such as petroleum or coal tar pitch derived cokes.

The metal compound may be a compound containing at least one metal selected from Si, Ge, Sn, Pb, P, Sb, Bi, Al, Ga, In, Ti, Mn, Fe, Co, Ni, Cu, Zn, Ag, Mg, Sr and Ba. Such a metal compound may be used in the form of a combination, an alloy, an oxide (e.g., $TiO_2$ and $SnO_2$), a nitride, a sulfide, a boride, an alloy with lithium and any other form. Among these, forms such as a combination, an alloy, an oxide and an alloy with lithium can provide the high capacity of a battery. In particular, a compound containing at least one metal selected from Si, Ge and Sn, preferably Si and Sn can provide even higher capacity of a battery.

The anode may be prepared by mixing an anode active material, a conductive material, a polymer binder, and a solvent having a high boiling point to form an anode composite slurry, and applying the slurry on a current collector, followed by drying, compression molding, and then heat-treatment at a temperature of 50 to 250° C. under vacuum for 2 hours.

Also, the anode has a layer thickness of 1 to 100 µm, preferably 3 to 70 µm. When the anode satisfies such a thickness range, a sufficient amount of an active material is provided in an anode active material layer to prevent a battery capacity from being lowered and improve cycle and rate characteristics.

In the present disclosure, the conductive material and the polymer binder in the anode may be the same as defined above to be used in the cathode.

Meanwhile, the separator which may be used in the present disclosure includes any one which has been conventionally used in the art, for example, porous membranes or non-woven fabrics made of a polyolefin-based polymer, but is not limited thereto.

The polyolefin-based porous membranes may be obtained from a polymer selected from polyethylenes such as a high-density polyethylene, a linear low-density polyethylene, a low-density polyethylene and an ultra-high molecular weight polyethylene, polypropylene, polybutylene, polypentene, and a mixture thereof.

The non-woven fabric may be a polyolefin-based non-woven fabric, or a non-woven fabric made of a polymer selected from polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate and a mixture thereof. The non-woven fabric may be a spun-bond or melt-blown fabric consisting of a long fiber in structure.

The porous substrate has preferably a thickness of 5 to 50 µm, but is not particularly limited thereto. Also, the porous substrate has a pore size of 0.01 to 50 µm and a porosity of 10 to 95%, but is not particularly limited thereto.

Also, in order to improve the mechanical strength of the separator and the safety of the electrochemical device, a porous coating layer comprising inorganic particles and a polymer binder may further be formed on at least one surface of the porous substrate.

In the porous coating layer, the polymer binder allows the adhesion of inorganic particles so that the inorganic particles can be bound with each other (i.e., the polymer binder connects and immobilizes the inorganic particles therebetween). Also, the porous coating layer comes in contact with the porous substrate by the polymer binder. In the porous coating layer, the inorganic particles are substantially present in contact with each other to form a closest packed structure, and an interstitial volume generated from the contact of the inorganic particles with each other becomes a pore of the porous coating layer.

The inorganic particles are not particularly limited if they are electrochemically stable. That is, the inorganic particles which may be used in the present disclosure are not particularly limited unless an oxidation-reduction reaction occurs in an operating voltage range (for example, 0 to 5 V based on $Li/Li^+$) of an applied electrochemical device. Particularly, inorganic particles having a high dielectric constant can increase the dissociation rate of an electrolyte salt, such as a lithium salt, in a liquid electrolyte, thereby improving an ionic conductivity the electrolyte solution.

Also, inorganic particles having a high dielectric constant may be used to increase a dissociation rate of an electrolyte salt, e.g., a lithium salt, in a liquid electrolyte, thereby improving an ionic conductivity of the electrolyte.

For these reasons, the inorganic particles are preferably inorganic particles having a dielectric constant of 5 or higher, inorganic particles having the ability to transport lithium ions, or a mixture thereof.

Examples of the inorganic particles having a dielectric constant of 5 or higher include $BaTiO_3$, $Pb(Zr_x,Ti_{1-x})O_3$ (PZT, 0<x<1), $Pb_{1-x}La_xZr_{1-y}Ti_yO_3$ (PLZT, 0<x<1, 0<y<1), $(1-x)Pb(Mg_{1/3}Nb_{2/3})O_3\text{-}xPbTiO_3$ (PMN-PT, 0<x<1), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, SiC and $TiO_2$ inorganic particles, and they may be used alone or as a mixture of two or more thereof.

Among these, inorganic particles such as $BaTiO_3$, $Pb(Zr_x,Ti_{1-x})O_3$ (PZT, 0<x<1), $Pb_{1-x}La_xZr_{1-y}Ti_yO_3$ (PLZT, 0<x<1, 0<y<1), $(1-x)Pb(Mg_{1/3}Nb_{2/3})O_3\text{-}xPbTiO_3$ (PMN-PT, 0<x<1) and hafnia ($HfO_2$) exhibit a high dielectric characteristic of a dielectric constant of 100 or higher, as well as piezoelectricity which occurs when constant pressure is applied to induce a potential difference between both surfaces, thereby preventing the generation of internal short circuit between both electrodes due to external impact and thus further improving the safety of electrochemical devices. Also, when a mixture of inorganic particles having a high dielectric constant and inorganic particles having the ability to transport lithium ions is used, the synergetic effect thereof can be obtained.

In the present invention, the inorganic particles having the ability to transport lithium ions refer to inorganic particles containing lithium atom which are capable of moving lithium ions without storing the lithium. The inorganic particle having the ability to transport lithium ions may transfer and move lithium ions due to a kind of defect existing in the particle structure, so it is possible to improve lithium ion conductivity in the battery and also improve the performance of the battery. Non-limiting examples of the inorganic particles having the ability to transport lithium ions include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$ type glass (0<x<4, 0<y<13) such as $14Li_2O\text{-}9Al_2O_3\text{-}38TiO_2\text{-}39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5) such as $Li_{3.25}Ge_{0.25}P_{0.75}S_4$, lithium nitride ($Li_xN_y$, 0<x<4, 0<y<2) such as $Li_3N$, $SiS_2$ type glass ($Li_xSi_yS_z$, 0<x<3, 0<y<2, 0<z<4) such as $Li_3PO_4$—$Li_2S$—$SiS_2$, $P_2S_5$ type glass ($Li_xP_yS_z$, 0<x<3, 0<y<3, 0<z<7) such as $LiI$—$Li_2S$—$P_2S_5$, and a mixture thereof.

The inorganic particles are not limited to their size, but may have an average diameter of 0.001 to 10 µm so as to obtain a suitable porosity of the separator.

The polymer binder used to form the porous coating layer may be any one which is conventionally used in the formation of a porous coating layer in the art. The polymer binder has preferably a glass transition temperature ($T_g$) of −200 to 200° C. so as to improve the mechanical properties such as flexibility and elasticity of the coating layer finally formed. Such a polymer binder plays a role of connecting and immobilizing inorganic particles therebetween, thereby preventing the mechanical property of the separator having the porous coating layer from being reduced.

Also, the polymer binder is not necessarily required to have ionic conductivity, however, a polymer having ionic conductivity may be used to improve the performances of electrochemical devices. Accordingly, the polymer binder used in the present disclosure preferably includes one having a high dielectric constant. Actually, the dissociation rate of a salt in an electrolyte solution depends on a dielectric constant of the electrolyte solution. Therefore, as the dielectric constant of the polymer binder is higher, the dissociation rate of a salt in an electrolyte solution increases. In this regard, in the present disclosure, the polymer binder may have a dielectric constant of 1.0 to 100 (measuring frequency=1 kHz), preferably 10 or higher.

In addition, the polymer binder may be gelatinized when impregnated with a liquid electrolyte solution to exhibit a high degree of swelling in an electrolyte solution. In this regard, it is preferred that the polymer binder has a solubility parameter of 15 to 45 $MPa^{1/2}$, more preferably 15 to 25 $MPa^{1/2}$, most preferably 30 to 45 $MPa^{1/2}$. Accordingly, a hydrophilic polymer having many polar groups is favorably used as compared to a hydrophobic polymer such as polyolefine. When the solubility parameter of the polymer is less than 15 $MPa^{1/2}$ or higher than 45 $MPa^{1/2}$, the polymer is difficult to be swelled by a conventional liquid electrolyte solution for a battery.

The polymer binder may be any one selected from the group consisting of polyvinylidene fluoride (PVDF), hexafluoro propylene (HFP), polyvinylidene fluoride-co-hexafluoro propylene, polyvinylidene fluoride-co-trichloroethylene, polymethyl methacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile-styrene-butadiene copolymer, polyimide, and a mixture thereof, but is not limited thereto.

Also, the weight ratio of the inorganic particles and the polymer binder may be in the range of 50:50 to 99:1, preferably 60:40 to 90:10, more preferably 70:30 to 80:20.

In addition, the thickness of the porous coating layer formed from the inorganic particles and the polymer binder is not particularly limited, but preferably 0.01 to 20 μm. The pore size and the porosity of the porous coating layer are not particularly limited, but preferably, the pore size may be in the range of 0.01 to 10 μm, and the porosity may be in the range of 5 to 90%.

Meanwhile, the electrolyte solution used in the present disclosure comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte solution used in the present disclosure comprises an organic solvent which is conventionally used in an electrolyte solution for a lithium secondary battery, for example, ethers, esters, amides, linear carbonates, cyclic carbonates, and a mixture thereof.

Among these, a linear carbonate, a cyclic carbonate, or a mixture thereof is representatively used.

The cyclic carbonate may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof. Examples of the halide include fluoroethylene carbonate (FEC) and the like, but are not limited thereto.

The linear carbonate may be selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

The introduction of the non-aqueous electrolyte may be carried out in any suitable step during the manufacturing of the electrochemical device depending on the manufacturing processes and desired physical properties of a final product. Specifically, the electrolyte may be introduced before assembling a battery or in the final step of the assembling.

Hereinafter, preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

1. Example 1-1. Preparation of Cathode 90.6 wt % of $LiMn_2O_4$ as a lithium manganese oxide, 4.4 wt % of super C as a conductive material, 4.1 wt % of KF-7208 (PVDF) as a polymer binder, and 0.9 wt % of poly(3,4-ethylenedioxy)thiophene as a conductive polymer were mixed to obtain a cathode material composite, and the composite was added to NMP used as a solvent to obtain a cathode material composite-containing slurry. The slurry was coated on an Al-foil having a thickness of 20 μm by way of roll-coating, followed by drying at 130° C., to prepare a cathode.

1-2. Preparation of Coin-type Half-Cell

The cathode prepared in step 1-1 and a metallic lithium foil as an anode were used, and a polyethylene separator was interposed between them, to obtain an electrode assembly.

The electrode assembly was put in a battery case, in which as an electrolyte solution, a 1M solution of $LiPF_6$ in a non-aqueous solvent being a mixture of ethylene carbonate (EC) and ethyl methyl carbonate (EMC) (3:7) was introduced, thereby preparing a coin-type half-cell.

2. Comparative Example
2-1. Preparation of Cathode

The procedures of the Example were repeated except that 91.5 wt % of $LiMn_2O_4$ as a lithium manganese oxide, 4.4 wt % of super C as a conductive material, and 4.1 wt % of KF-7208 (PVDF) as a polymer binder were mixed to obtain a cathode material composite, and the composite was added to NMP, thereby preparing a cathode.

2-2. Preparation of Coin-type Half-Cell

The procedures of the Example were repeated except that the cathode prepared in step 2-1 was used to prepare a coin-type half-cell.

3. Evaluation of Rate Characteristics

The coin-type half-cells prepared in the Example and the Comparative Example were evaluated for their charging and discharging characteristics.

(1) 1$^{st}$ and 2$^{nd}$ Cycles

Charging was conducted with a current density of 0.1 C up to 4.43 V under constant voltage and continued with a constant voltage of 4.35 V, and then the charging process was completed when the current density reached 0.02 C. Discharging was conducted with a current density of 0.1 C up to 2.5V under constant current. Under the same conditions, a charging/discharging cycle was further conducted once.

(2) 3$^{rd}$ and 4$^{th}$ Cycles

Charging was conducted with a current density of 0.2 C up to 4.43 V under constant voltage and continued with a constant voltage of 4.35 V, and then the charging process was completed when the current density reached 0.02 C. Discharging was conducted with a current density of 0.5 C up to 2.5V under constant current. Under the same conditions, a charging/discharging cycle was further conducted once.

(3) 5$^{th}$ and 6$^{th}$ Cycles

Charging was conducted with a current density of 0.2 C up to 4.43 V under constant voltage and continued with a constant voltage of 4.43 V, and then the charging process was completed when the current density reached 0.02 C. Discharging was conducted with a current density of 1 C up to 2.5V under constant current. Under the same conditions, a charging/discharging cycle was further conducted once.

(4) 7$^{th}$ and 8$^{th}$ Cycles

Charging was conducted with a current density of 0.2 C up to 4.43 V under constant voltage and continued with a constant voltage of 4.43 V, and then the charging process was completed when the current density reached 0.02 C. Discharging was conducted with a current density of 2 C up to 2.5V under constant current. Under the same conditions, a charging/discharging cycle was further conducted once.

(5) 9$^{th}$ and 10$^{th}$ Cycles

Charging was conducted with a current density of 0.2 C up to 4.43 V under constant voltage and continued with a constant voltage of 4.43 V, and then the charging process was completed when the current density reached 0.02 C. Discharging was conducted with a current density of 0.5 C up to 2.5V under constant current. Under the same conditions, a charging/discharging cycle was further conducted once.

FIG. 1 is a graph showing rate characteristics of half-cells prepared in the Example and the Comparative Example. From FIG. 1, the half-cell of the Example is confirmed to exhibit improved rate characteristics as compared with that of the Comparative Example.

The foregoing disclosure is given by way of illustration only, and various changes and modifications within the spirit and scope of the disclosure will become apparent to those skilled in the art from this detailed description. Accordingly, it should be understood that the Examples of the present disclosure are provided for the purpose of illustrations only and to better explain to a person having ordinary skill in the art, and is not intended to limit the scope of the present disclosure. The scope of the present to be protected should be defined by the claims, all technical spirits equivalent thereto should be interpreted to be fallen within the scope of the present disclosure.

What is claimed is:

1. A cathode material composite, comprising:
   a spinel-structured lithium manganese oxide particle having a core-shell structure, wherein the core has a cubic structure and the shell has a tetragonal structure;
   a conductive polymer disposed on the surface of the shell;
   a conductive material; and
   a polymer binder
   wherein the conductive polymer is poly(3,4-ethylenedioxy)thiophene.

2. The cathode material composite of claim 1, wherein the lithium manganese oxide is represented by the following formula (I):

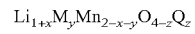

wherein, x, y, and z satisfy 0≤x≤0.3, 0≤y≤1, and 0≤z≤1;
M is any one selected from the group consisting of Al, Mg, Ni, Co, Fe, Cr, V, Ti, Cu, B, Ca, Zn, Zr, Nb, Mo, Sr, Sb, W, Ti, Bi, and a mixture thereof; and
Q is any one selected from the group consisting of N, F, S, Cl, and a mixture thereof.

3. The cathode material composite of claim 1, wherein the conductive material is any one selected from the group consisting of graphite, carbon fiber, carbon black, acetylene black, ketjen black, carbon nanotube, and a mixture thereof.

4. The cathode material composite of claim 1, wherein the polymer binder is any one selected from the group consisting of polyvinylidene fluoride (PVDF), hexafluoro propylene (HFP), polyvinylidene fluoride-co-hexafluoro propylene, polyvinylidene fluoride-co-trichloroethylene, polymethyl methacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile-styrene-butadiene copolymer, polyimide, and a mixture thereof.

5. The cathode material composite of claim 1, wherein the spinel-structured lithium manganese oxide is present in an amount ranging from 85 to 95 wt %, the conductive material is present in amount ranging from 1 to 7 wt %, the polymer binder is present in an amount ranging from 1 to 7 wt %, and the conductive polymer is present in an amount ranging from 0.5 to 1.5 wt %, based on the total weight of the cathode material composite.

6. A cathode, comprising a current collector and a cathode active material layer formed on the current collector, wherein the cathode active material layer comprises the cathode material composite according to claim 1.

7. An electrochemical device, comprising the cathode of claim 6, an anode and a separator interposed between the cathode and the anode.

8. The electrochemical device according to claim 7, wherein the electrochemical device is a lithium secondary battery.

* * * * *